US006942904B2

(12) United States Patent
Dahlberg

(10) Patent No.: US 6,942,904 B2
(45) Date of Patent: Sep. 13, 2005

(54) DRY END SURFACE TREATMENT USING ULTRASONIC TRANSDUCERS

(75) Inventor: Hakan Dahlberg, Uppsala (SE)

(73) Assignee: Ultra Technology Europe AB (SE)

( * ) Notice: Subject to any disclaimer, the term of this patent is extended or adjusted under 35 U.S.C. 154(b) by 90 days.

(21) Appl. No.: 10/659,853

(22) Filed: Sep. 11, 2003

(65) Prior Publication Data

US 2004/0058075 A1 Mar. 25, 2004

Related U.S. Application Data

(63) Continuation-in-part of application No. 10/451,962, filed as application No. PCT/SE02/02195 on Nov. 28, 2002.

(60) Provisional application No. 60/339,380, filed on Dec. 11, 2001.

(51) Int. Cl.[7] .............................. B01J 19/10; B05D 3/12

(52) U.S. Cl. ....................... 427/560; 427/600; 427/356; 427/358; 118/57; 118/123; 118/126

(58) Field of Search ................................ 427/560, 600, 427/601, 356, 358; 118/123, 126, 57

(56) References Cited

U.S. PATENT DOCUMENTS 6,303,187 B1 * 10/2001 Leino et al. ................ 427/356

FOREIGN PATENT DOCUMENTS

DE 23 56 737 * 5/1975

* cited by examiner

*Primary Examiner*—Katherine Bareford
(74) *Attorney, Agent, or Firm*—Rolf Fasth; Fasth Law Offices

(57) ABSTRACT

The method is for applying a coating on a paper substance. A paper moves over a set of rollers. A coating is applied with a coating applicator that has ultrasonic transducers to vibrate the coating to reduce the viscosity of the coating. A downstream blade has an ultrasonic transducer in operative engagement with the blade. The vibrating blade is applied to the paper for scraping off excessive coating from the paper.

9 Claims, 13 Drawing Sheets

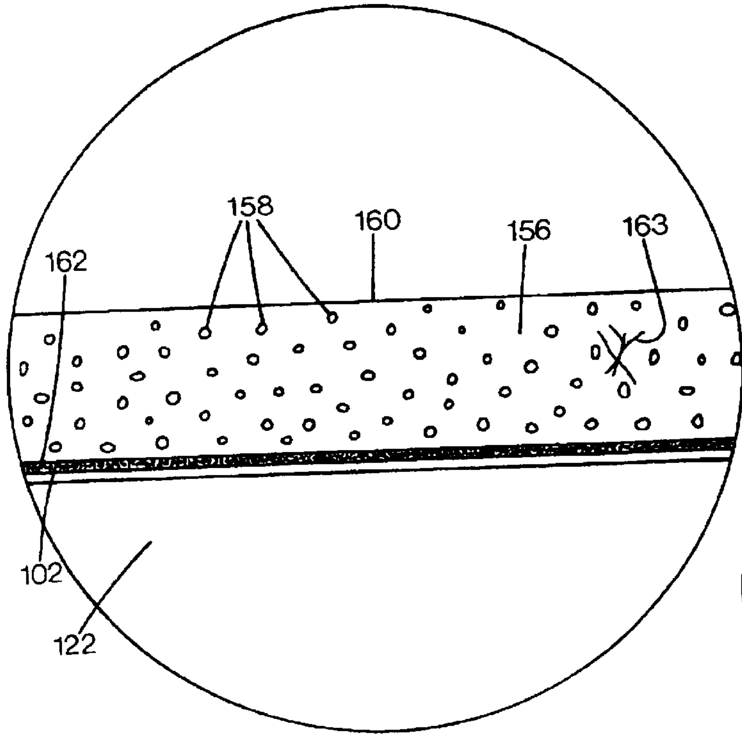
FIG. 5A
FIG. 5B
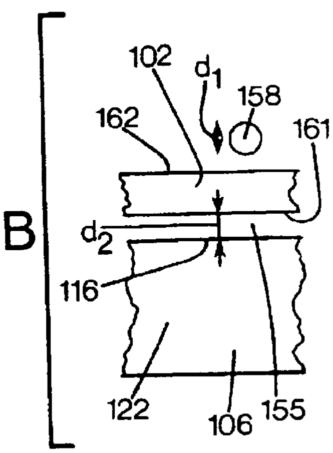
FIG. 5
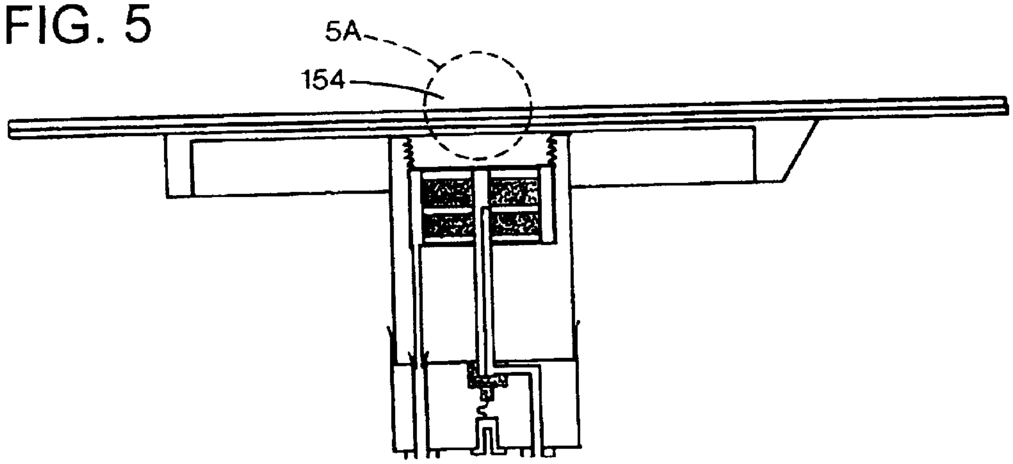

DRY END SURFACE TREATMENT USING ULTRASONIC TRANSDUCERS

PRIOR APPLICATION

This is a continuation-in-part application of U.S. patent application Ser. No. 10/451,962, filed 27 Jun. 2003 that claims priority from PCT application No. PCT/SE02/02195, filed 28 Nov. 2002, that claims priority from U.S. provisional patent application Ser. No. 60/339,380, filed 11 Dec. 2001.

TECHNICAL FIELD

The present invention is a method for a paper machine dry end or off line coater paper surface treatment using ultrasonic transducers.

BACKGROUND AND SUMMARY OF INVENTION

Ultrasonic energy has been applied to liquids in the past. Sufficiently intense ultrasonic energy applied to a liquid, such as water, produces cavitation that can induce changes in the physiochemical characteristics of the liquid. The subject of sonochemistry, which deals with phenomena of that sort, has grown very much during recent years.

The published material is sonochemistry and related subjects all pertains to batch processes, that is, the liquid solution or dispersion to be treated is placed in a container. The liquid in the container is then stirred or otherwise agitated, and ultrasound is applied thereto. It is then necessary to wait until the desired result, physical or chemical change in the liquid, is achieved, or until no improvement in the yield is observed. Then the ultrasound is turned off and the liquid extracted. In this way liquid does not return to its initial state prior to the treatment with ultrasonic energy. In this respect, the ultrasound treatment is regarded as irreversible or only very slowly reversible.

Far from all industrial processes using liquids are appropriately carried out in batches, as described above. In fact, almost all large-scale processes are based upon continuous processing. The reasons for treating liquids in continuous processes are many. For example, the fact that a given process may not be irreversible, or only slowly reversible, and requires that the liquid be immediately treated further before it can revert to its previous state.

Shock waves external to collapsing bubbles driven onto violent oscillation by ultrasound are necessary for most if not all physiochemical work in liquid solutions. The underpressure pulses form the bubbles and the pressure pulses compress the bubbles and consequently reduce the bubble diameter. After sufficient number of cycles, the bubble diameter is increased up to the point where the bubble has reached its critical diameter whereupon the bubble is driven to a violent oscillation and collapses whereby a pressure and temperature pulse is generated. A very strong ultrasound field is forming more bubbles, and drives them into violent oscillation and collapse much quicker.

A bubble that is generated within a liquid in motion occupies a volume within said liquid, and will follow the speed of flow within said liquid. The weaker ultrasound field it is exposed to, the more pulses it will have to be exposed to in order to come to a violent implosion. This means that the greater the speed of flow is, the stronger the ultrasound field will have to be in order to bring the bubbles to violent implosion and collapse. Otherwise, the bubbles will leave the ultrasound field before they are brought to implosion. A strong ultrasound field requires the field to be generated by very powerful ultrasound transducers, and that the energy these transducers generate is transmitted into the liquid to be treated. Based upon this requirement, Bo Nilsson and Håkan Dahlberg started a development of new types of piezoelectric transducer that could be driven at voltages up to 13 kV, and therefore capable of generating very strong ultrasonic fields.

A very strong ultrasonic source will cause a cushion of bubbles near the emitting surface. The ultrasound cannot penetrate through this cushion, and consequently no ultrasound can penetrate into the medium to be treated. The traditional way to overcome this problem is to reduce the power in terms of watts per unit area of emitting surface applied to the ultrasonic transducers. As indicated above, the flow speed of the medium to be treated will require a stronger ultrasound field and therefore an increased power applied to the ultrasonic transducers. The higher the power input is, the quicker the cushion is formed, and the thicker the formed cushion will be. A thick cushion will completely stop all ultrasound penetration into a liquid located on the other side of this cushion. All the cavitation bubbles in this cushion will then stay in the cushion and cause severe cavitation damage to the ultrasound transducer assembly area leading to a necessary exchange of that part of the ultrasound system. This means that little or no useful ultrasound effect is achieved within the substrate to be treated, and that the ultrasound equipment may be severely damaged.

The above problems also apply to the application of coating to papers. There is a need for a more effective way of applying a coating, removing excess coating from and forming a smooth coating surface on a movable paper substance when the coating color has very high dry solids content.

The method of the present invention provides a solution to the above outline problems. More particularly, the method is for applying a coating on a paper substance. A paper moves over a set of rollers. A coating is applied with a coating applicator that has ultrasonic transducers to vibrate the coating to reduce the viscosity of the coating. A downstream blade has an ultrasonic transducer in operative engagement with the blade. The vibrating blade is applied to the paper for scraping off excessive coating from the paper. The ultrasonic energy of the blade makes it possible to use a coating with a higher dryness so that there is less water to dry up and remove and still get a smooth coating surface.

BRIEF DESCRIPTION OF THE DRAWINGS

FIG. 5 is a cross-sectional side view of the transducer system of the present invention;

FIG. 5A is an enlarged view of cavitation bubbles dispersed in slurry disposed above the movable endless medium;

FIG. 5B is a detailed view of a distance between the permeable medium and the foil;

DETAILED DESCRIPTION

Figure 1:
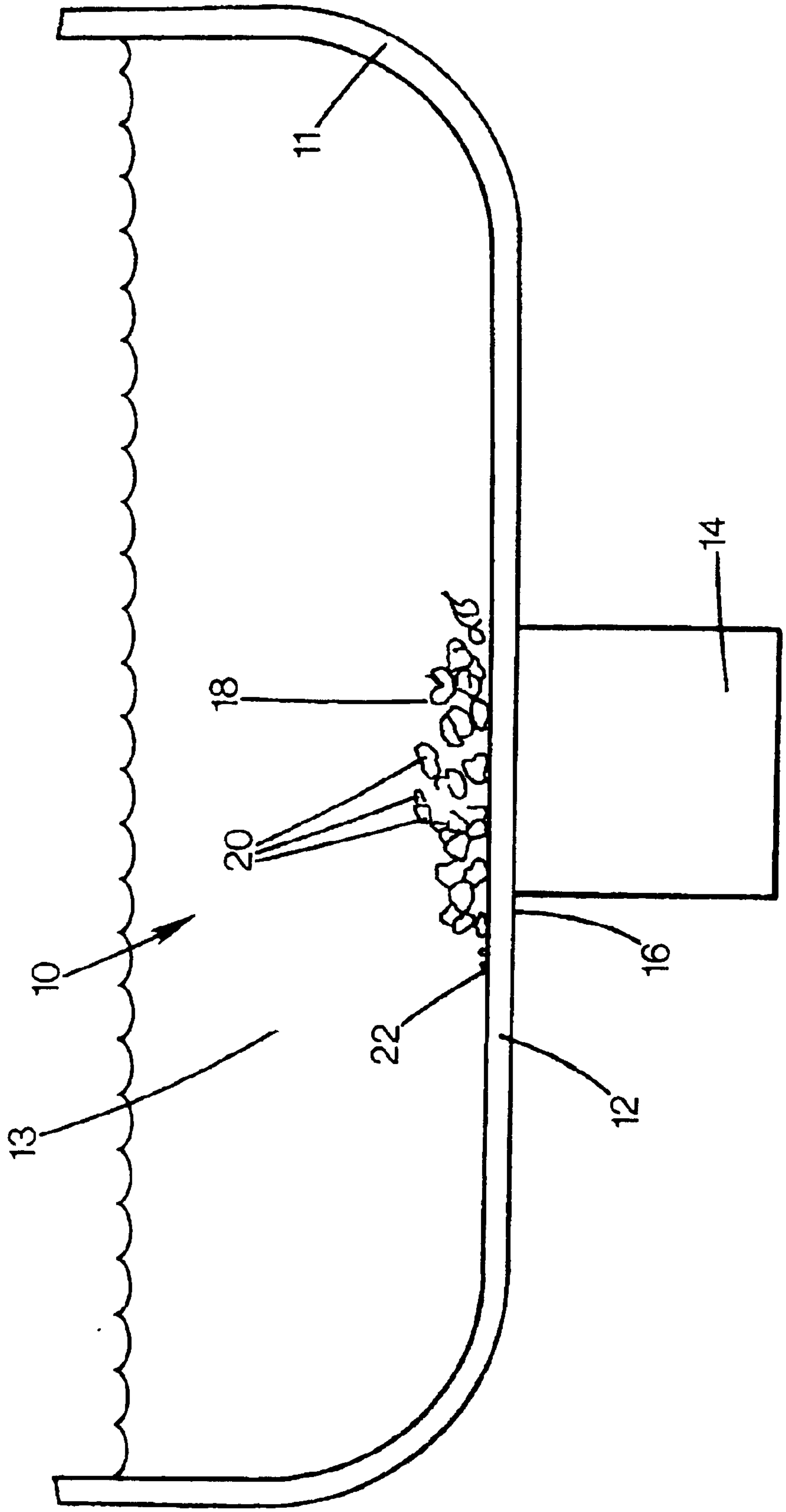
FIG. 1 is a schematic side view of the formation of a reactor of a prior art system.

FIG. 1 is a side view of a prior art transducer system 10 that has a container 11, such as a stainless reactor, with a wall 12 for containing a liquid 13. A transducer 14 is attached to an outside 16 of the wall 12. When the transducer 14 is activated, a pillow 18 of cavitation bubbles 20 are formed on an inside 22 of the wall 12 due to the fracture zone in the liquid 13 that may be a result of fracture impressions on the inside 22 of the wall 12. The bubbles may be held to the inside wall due to the surface tension of the liquid 13. The bubbles 20 are good insulators and prevent the effective transmission of the ultrasonic energy into the liquid 13. The under-pressure pulses of the ultrasonic energy transmitted by the transducer 14 create the cavitation bubbles. In this way, the pressure inside the bubbles is very low.

Figure 2:
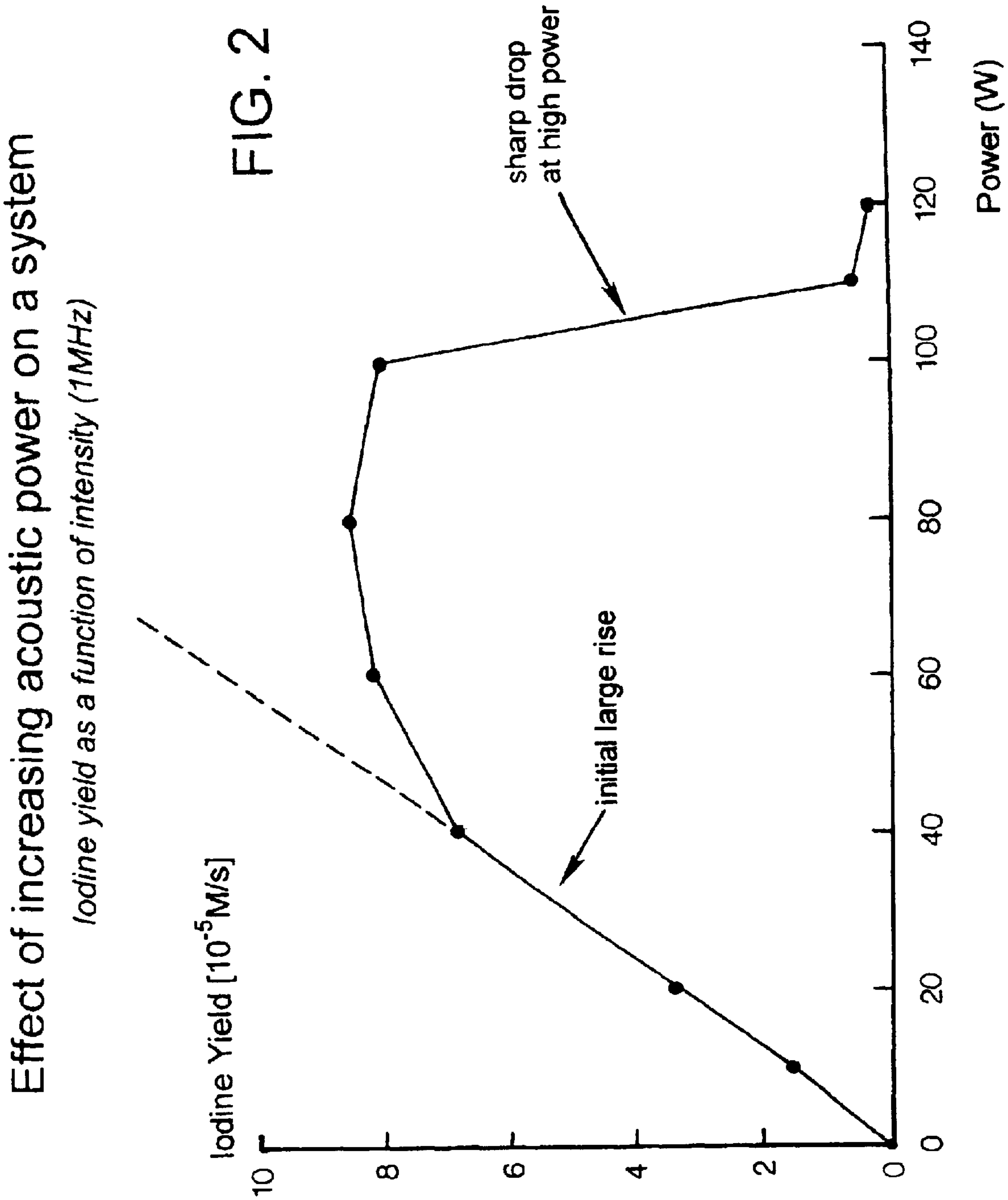
FIG. 2 is a graphical illustration of the correlation between iodine yield and acoustic power.

FIG. 2 is a graphical illustration that shows the iodine yield is affected by increased acoustic power on the system 10. The more power is applied, the thicker the formation of the bubbles 20, as shown in FIG. 1, and the yield increase is reduced and drops sharply at power ratings over 100 Watts in this case. In this way, the cavitation bubbles severely limit the usefulness of increasing the acoustic power to improve the iodine yield.

Figure 3:
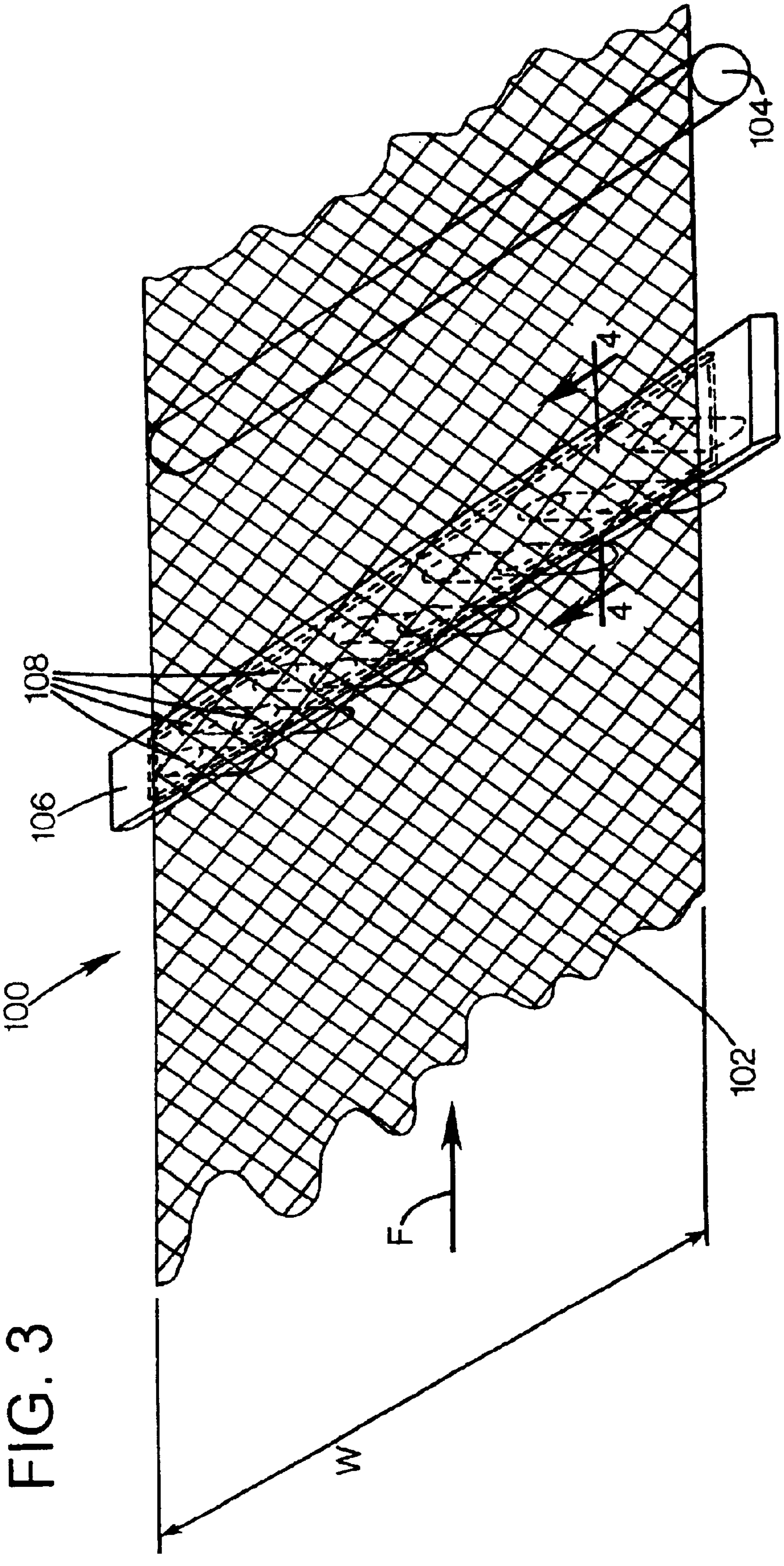
FIG. 3 is a perspective view of the transducer system of the present invention disposed below a movable endless member.

FIG. 3 is a perspective view of the transducer system 100 of the present invention. The system has a movable endless permeable medium 102, such as a woven material, paper machine plastic wire or any other bendable medium permeable to liquids, that is rotatable about rollers 104 that guide the medium 102 in an endless path. As explained below, it is important that the medium is permeable to a liquid that may carry ultrasonic energy to the liquid disposed above the medium 102 so as to effectively create the cavitation bubbles in the liquid or slurry to be treated. The ultrasonic energy may be used to reduce flocculation 163, best shown in FIG. 5A, of fibers in the liquid to be treated because the bubbles implode or collapse to generate pressure pulses to the fiber flocculation 163 so that the fibers are separated from one another to evenly distribute or disperse the fibers in the liquid. The pressure pulses may be about 500 to 1000 bars so the pulses are more forceful than the forces that keep the fiber flocculation together. In general, the longer the fibers are or the higher the fiber consistency is, the higher the tendency of flocculation.

The medium may have a rotational speed up to 2000 meters per minute in a forward direction as shown by an arrow (F). An elongate foil 106, made of, for example, steel or titanium is disposed below the permeable medium 102 and extends across a width (W) of the medium 102. A plurality of transducers 108, such as magnetostrictive, piezoelectric or any other suitable type of transducers, is in operative engagement with the foil 106 such as by being integrated therewith or attached thereto.

Figure 4:
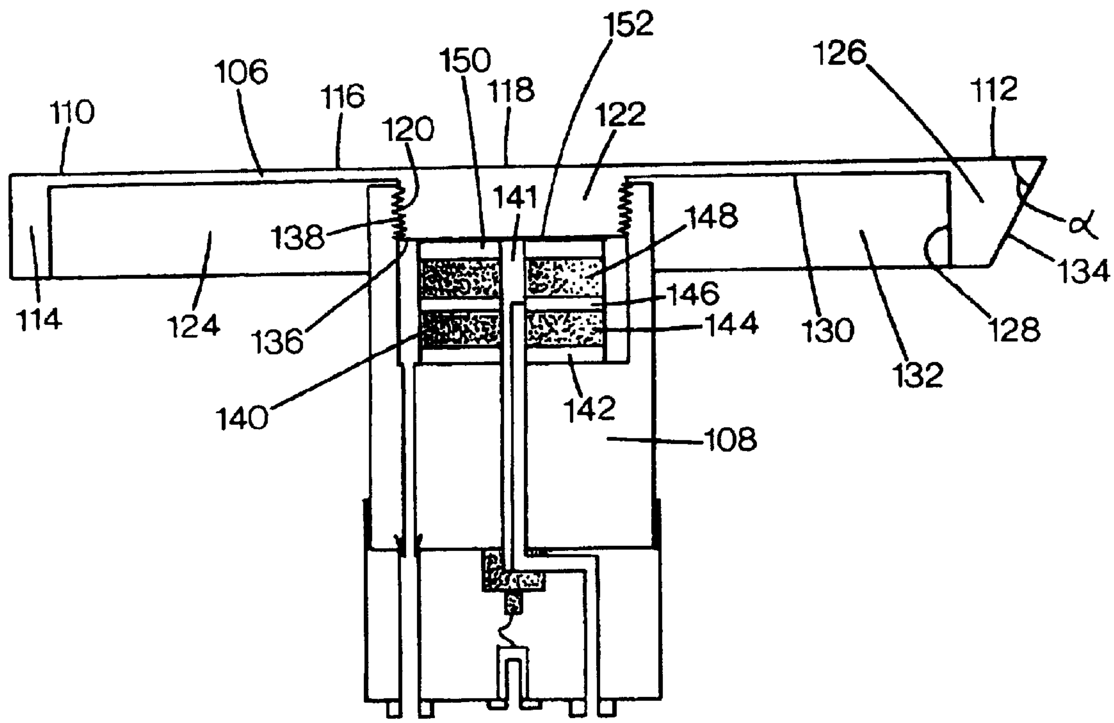
FIG. 4 is a cross-sectional view along line 4—4 in FIG. 3.

FIG. 4 is a detailed view of one of the transducers 108 attached to a mid-portion 118 of the hydrodynamic foil 106. More particularly, the foil 106 has a rear portion 110 and a front portion 112. The rear portion 110 has a rectangular extension 114 that extends away from a top surface 116 of the foil 106. The mid-portion 118 of the foil 106 has a threaded outside 120 of a connecting member 122 also extending away from the top surface 116 so that a cavity 124 is formed between the extension 114 and the connecting member 122.

The front portion 112 has an extension 126 that extends away from the top surface 116 and has a back wall 128 that is perpendicular to a bottom surface 130 of the foil 106 so that a cavity 132 is formed between the back wall 128 and the member 122. The extension 126 has a front wall 134 that forms an acute angle alpha with the top surface 116. The cavities 124 and 132 provide resonance to the ultrasound transmitted by the transducers 108 to reinforce the amplitude of the vibrations of the ultrasound. The front wall 134 forms an acute angle alpha with a top surface 116 of the foil 106 to minimize the pressure pulse when the water layer under the member is split by the front wall 134 so a larger part of the water is going down and only a minor part is going between the top side of the foil 116 and the member 102. When the member 102 is moving over the foil surface 116 a speed dependant under-pressure is created that will force down the member 102 against the foil surface 116. When the member is leaving the foil 106 there is room to urge the liquid 156 through the member 102.

In other words, the design of the extension 126 is particularly suitable for paper manufacturing that has slurry of water and fibers. The water layer split at the front wall 134 creates an under-pressure pulse so that the water on top of the moving member flows through the member 102 and into a container there below. The design of the extension 126 may also be designed for other applications than paper making that is only used as an illustrative example.

The transducer 108 has a top cavity 136 with a threaded inside wall 138 for threadedly receiving the member 122. The transducer 108 may be attached to the foil 106 in other ways. For example, adhesion or mechanical fasteners may attach the transducer. The present invention is not limited to the threaded connection described above.

Below the top cavity 136, a second housing cavity 140 is defined therein. The cavity 140 has a central segment 141 to hold a bottom cooling spacer 142, a lower piezoelectric element 144, a middle cooling spacer 146, an upper piezoelectric element 148 and a top cooling spacer 150 that bears against a bottom surface 152 of the connecting member 122. The spacers 142, 146, 150 are used to lead away the frictional heat that is created by the elements 144, 148.

By using three spacers, all the surfaces of the elements 144, 148 may be cooled. As the piezoelectric elements 144, 148 are activated, the thickness of the elements is changed in a pulsating manner and ultrasonic energy is transmitted to the member 122. For example, by using a power unit with alternating voltage of a level and frequency selected to suit the application at hand, the elements 144, 148 start to vibrate axially. In this way, if the AC frequency is 20 kHz then a sound at the same frequency of 20 kHz is transmitted. It is to be understood that any suitable transducer may be used to generate the ultrasonic energy and the invention is not limited to piezoelectric transducers.

FIG. 5 is an enlarged view of a central segment 154 so that the permeable movable member 102 bears or is pressed against the top surface 116 of the member 122 of the foil 106 so there is not sufficient space therebetween to capture cavitation bubbles. In other words, an important feature of the present invention is that a gap 155 defined between the foil 106 and the member 102 is much less than the critical bubble diameter so that no bubbles of critical size can be captured therebetween. The gap 155 between the member 102 and the foil 106 is defined by the tension in the member 102, the in-going angle between the member 102 and the foil 106, the pressure pulse induced by the water layer split at the front of the foil 106, the geometry of the foil 106, the under-pressure pulse when the member 102 leave the foil 106 and the out-going angle of the member 102. The bubbles 158 have a diameter d1 that is much longer than the distance d2 of the gap 155 between the top surface 116 of the foil 106 and the bottom surface 161 of the permeable member 102. In this way and by the fact that the member 102 is moving, the cavitation bubbles 158 are forced to be created above the permeable member 102 and by imploding disperse the liquid substance 156 that is subject to the ultrasonic treatment and disposed above the member 102. The liquid substance 156 has a top surface 160 so that the bubbles 158 are free to move between the top surface 160 of the substance 156 and a top surface 162 of the member 102. In general, the effect of the ultrasonic energy is reduced by the square of the distance because the liquid absorbs the energy. In this way, there are likely to be more cavitation bubbles formed close to the member 102 compared to the amount of bubbles formed at the surface 160. An important feature is that because the member 102 is moving and there is not enough room between the foil 106 and the member 102, no cavitation bubbles are captured therebetween or along the top surface 162 of the movable member 102.

Figure 6:
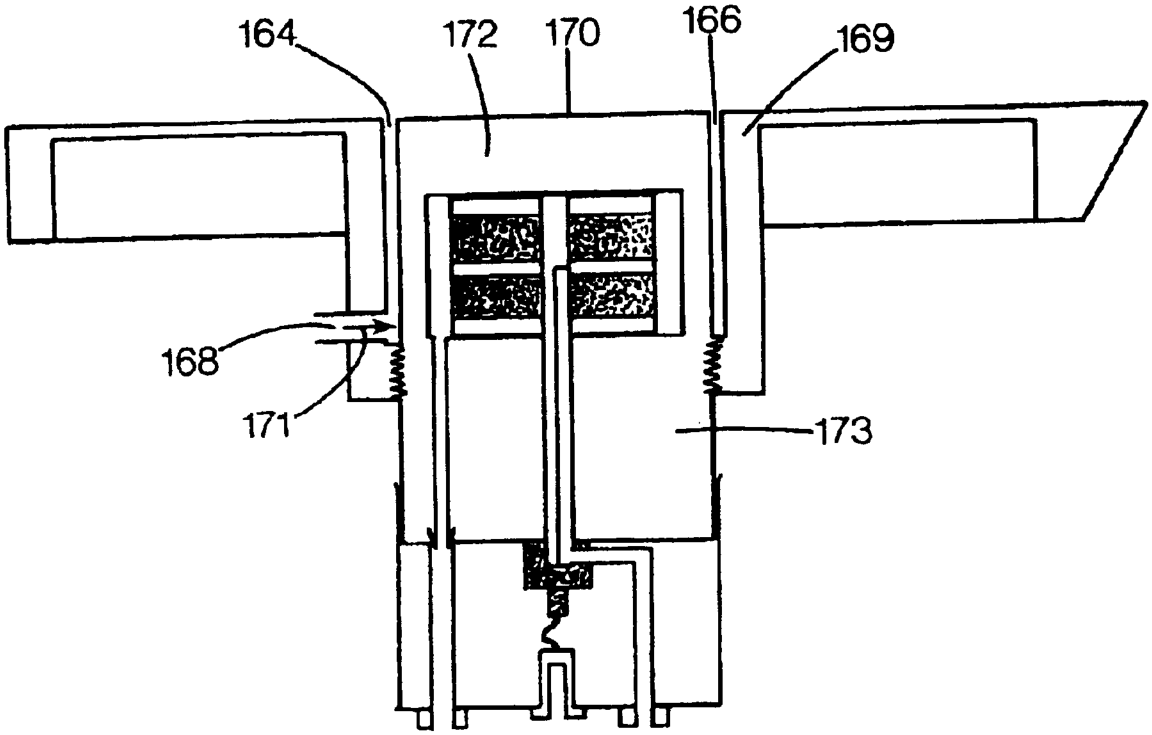
FIG. 6 is a cross-sectional view of a second embodiment of the transducer system of the present invention.

The second embodiment of a transducer system 173 shown in FIG. 6 is virtually identical to the embodiment shown in FIG. 4 except that the transducer system 173 has a first channel 164 and a second channel 166 defined therein that are in fluid communication with an inlet 168 defined in a foil member 169. The channels 164, 166 extend perpendicularly to a top surface 170 of a connecting member 172. The channels 164, 166 may extend along the foil 169 and may be used to inject water, containing chemicals, therethrough. For example, in papermaking, the chemicals may be bleaching or softening agents. Other substances such as foaming agents, surfactant or any other substance may be used depending upon the application at hand. The ultrasonic energy may be used to provide a high pressure and temperature that may be required to create a chemical reaction between the chemicals added and the medium. The channels 164, 166 may also be used to add regular water, when the slurry above the moving member is too dry, so as to improve the transmission of the ultrasonic energy into the slurry. The chemicals or other liquids mentioned above may also be added via channels in the front part of the transducer assembly bar 106. If the liquid content of the medium to be treated is very low, the liquid may simply be applied by means of spray nozzles under the web. Also in those cases may the applied liquid be forced into the web by the ultrasonic energy and afterwards be exposed to sufficient ultrasound energy to cause the desired reaction to take place between the chemicals and the medium to be treated.

Figure 7:
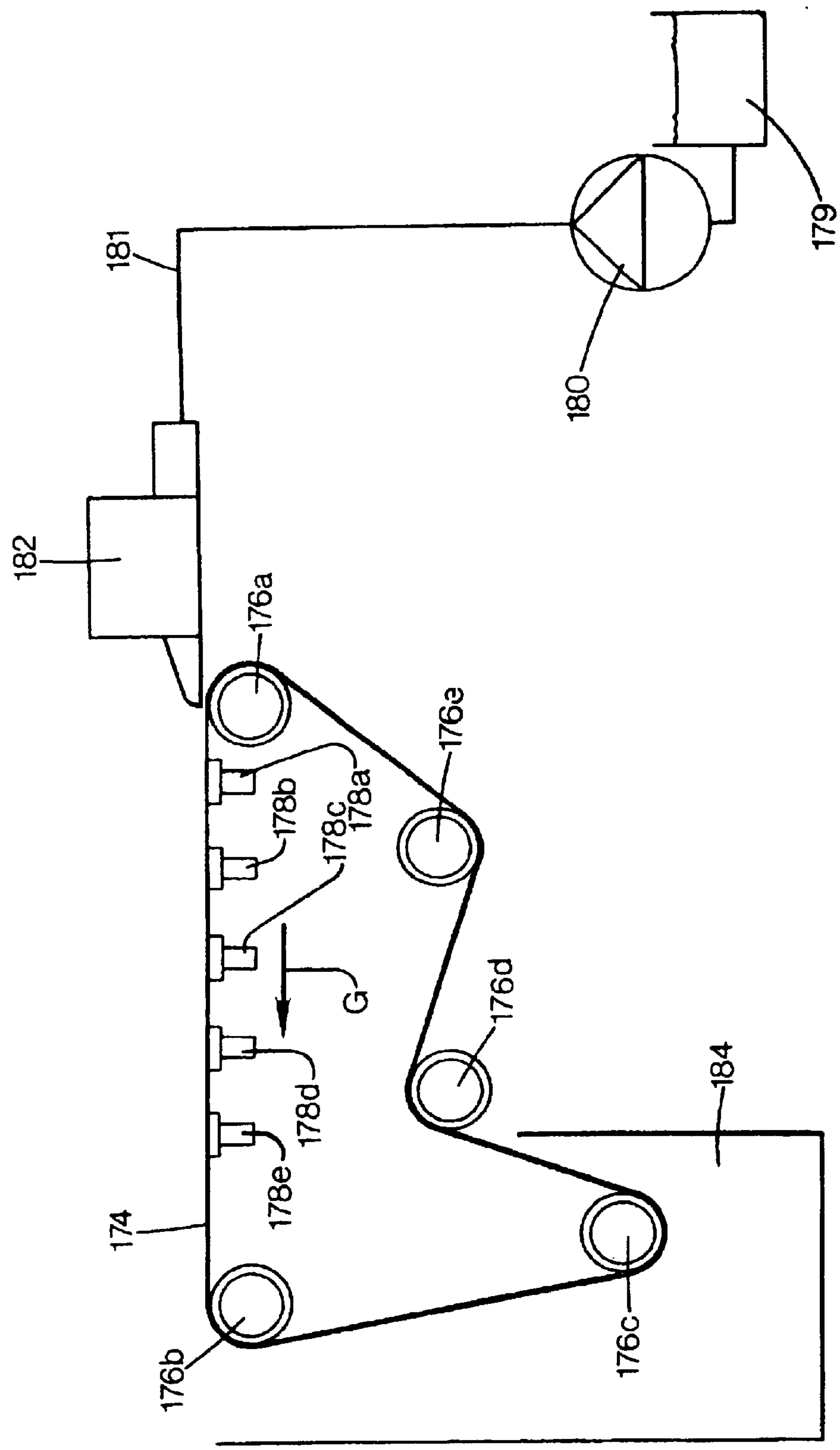
FIG. 7 is a cross-sectional view of a plurality of transducers disposed below a movable endless medium.

FIG. 7 is an overall side view showing an endless bendable permeable member 174 that is supported by rollers 176*a–e*. Below the member 174 is a plurality of transducer systems 178*a–e* for increased output by adding more ultrasonic energy to the system. By using a plurality of transducers, different chemicals may be added to the slurry 179, as required. The slurry 179 contains fibers or other solids, to be treated with ultrasonic energy, is pumped by a pump 180 in a conduit 181 via a distributor 182 onto the member 174 that moves along an arrow (G). The treated fibers may fall into a container 184.

The transducer system of the present invention is very flexible because there is no formation of cavitation bubble pillows in the path of the ultrasonic energy. By using a plurality of transducers, it is possible to substantially increase the ultrasonic energy without running into the problem of excessive cavitation bubbles to block the ultrasound transmission. The plurality of transducers also makes it possible to add chemicals to the reactor in different places along the moving member, as required.

Figure 8:
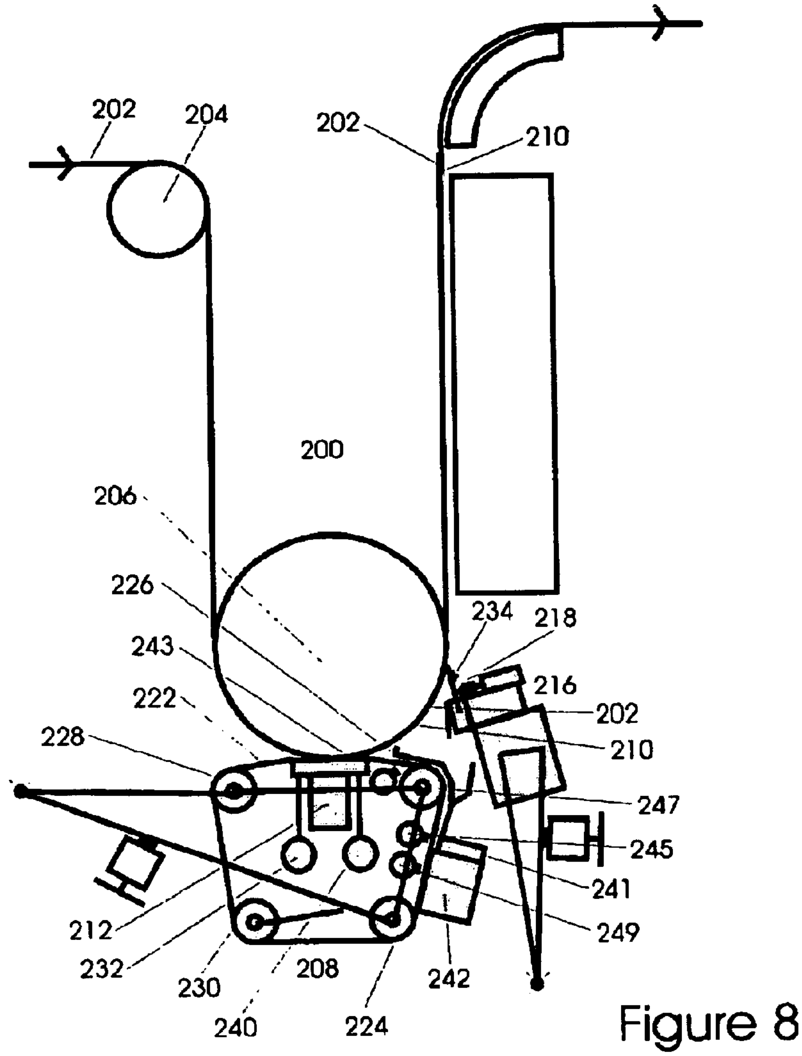
FIG. 8 is a cross-sectional view of a paper machine dry end paper surface treatment device.

FIG. 8 shows a paper machine dry end paper surface treatment device 200 that has a bendable paper 202 passing over a roller 204 and a roller 206. The paper 202 is subject to coating process by a coating applicator 208 at the roller 206. The applicator 208 applies a coating 210 onto the paper 202. The applicator 208 has an endless rotatable wire 222 that is guided by rollers 224, 226, 228, 230. An ultrasonic transducer 212 is positioned next to the wire 222 so that the paper 202 passes between the wire 222 and the roller 206. As described above, the transducer 212 is immediately adjacent to the wire 222 so that no undesirable bubbles are formed between the transducer and the wire 222. A coating distribution tube 232 provides the coating substance through the wire 222 and the transducer 212 enhances the depth of penetration of the coating 210 into the paper 202. The transducer 212 provides pulses and reduces the viscosity of the coating 210 to make the penetration more effective and the coating adheres better to the paper 202. The applicator 208 is particularly useful for thicker paper and paperboard. The applicator 208 has a water distribution conduit 240 that may be used to transport the excessive coating to the outer surface of the wire 222 to make it easier for the water showers 243 to remove it from the wire to the outer side of a collector 247. The water shower 245 may shower water on the wire that may be sucked into a suction box 241 together with eventual residual coating color from the wire and water and coating color pouring down the outer surface of the collector 247. The water shower 247 may shower water through the wire and into the suction box 242 to make sure that no coating color is left in the wire.

The coated paper 202 is subject to a blade device 216 downstream of the coating applicator 208. The device 216 bears against the coated surface of the paper 202. The device 216 has a relatively stiff blade 218 that may have a plurality of ultrasonic transducers 234 mounted thereon. The blade 218 scrapes off most of the coating 210 from the paper 202. For example, the blade 218 may scrape off about 90% of the coating so that only 10% of the coating remains on the paper 202. A collector 247 may be placed below the roller 206 to collect scraped off coating. The paper is then passed into a dryer 220 for further processing.

Figure 9:
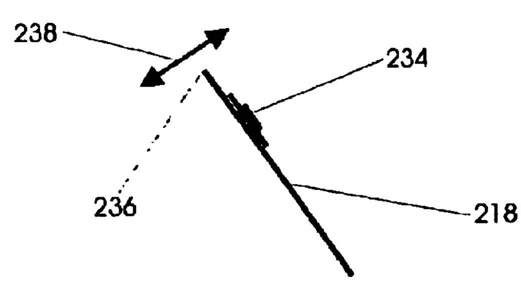
FIG. 9 is a detailed view of a blade.

Preferably, the blade 218 is stiff and is made of steel with the tip preferable of a suitable ceramic material. As best shown in FIG. 9, a plurality of ultrasonic transducers 234 may be placed every 70 millimeters or so along the width of the blade 218. The transducers may be glued to the blade 218 adjacent to a blade tip 236 so that the blade tip 236 vibrates according to the double arrows 238. The vibration of the blade tip 236 reduces the viscosity of the coating 210 so that a coating with a higher dryness may be used and less water is involved. This means that a higher speed of the paper 202 and lower energy consumption may be used since there is less water in the coating substance to remove by drying. Other advantages include lower friction and the ultrasonic blade cleaning gives extended blade lifetime.

Figure 10:
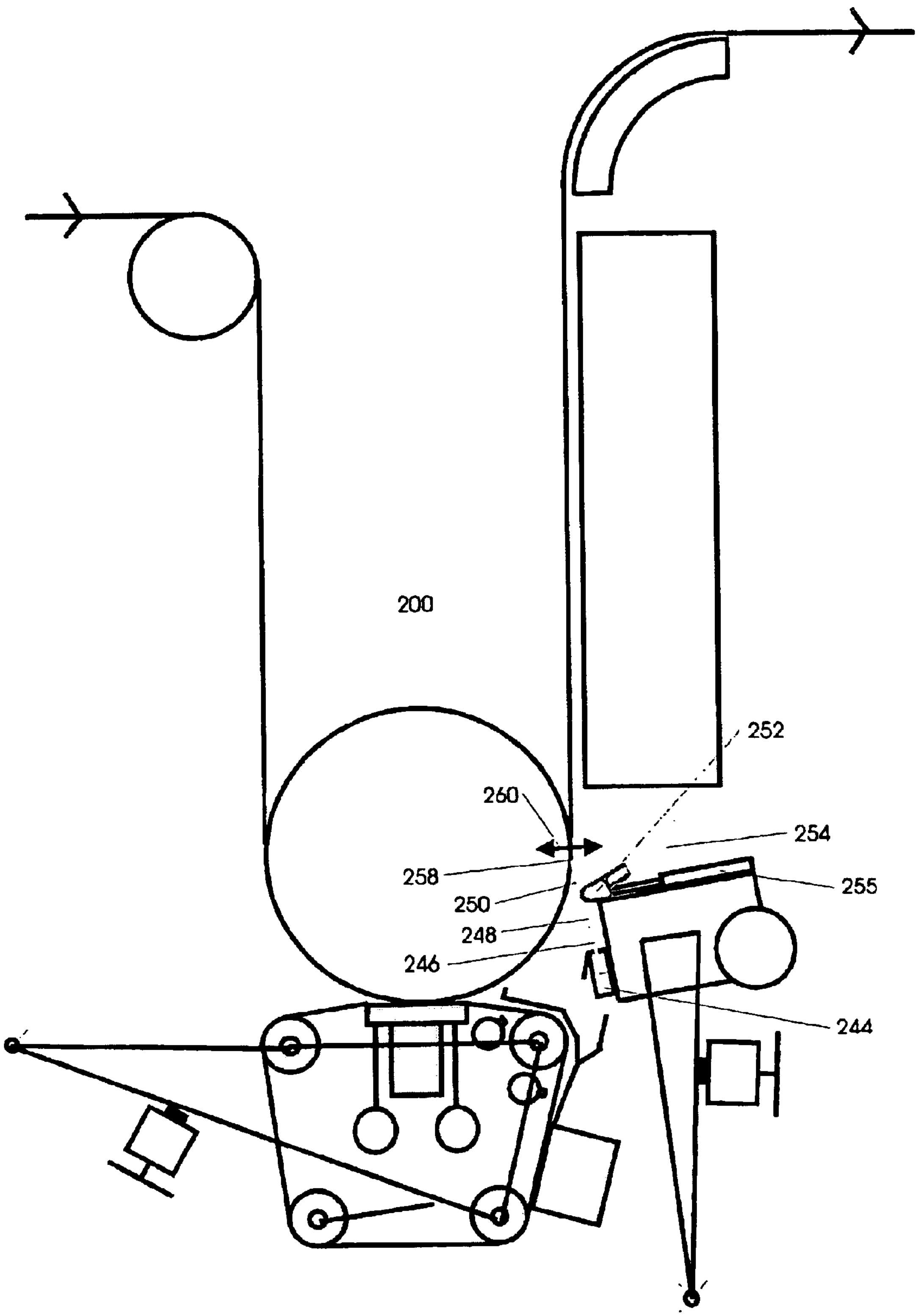
FIG. 10 is a cross-sectional view of a paper machine dry end paper surface treatment device with a bent blade.
Figure 11:
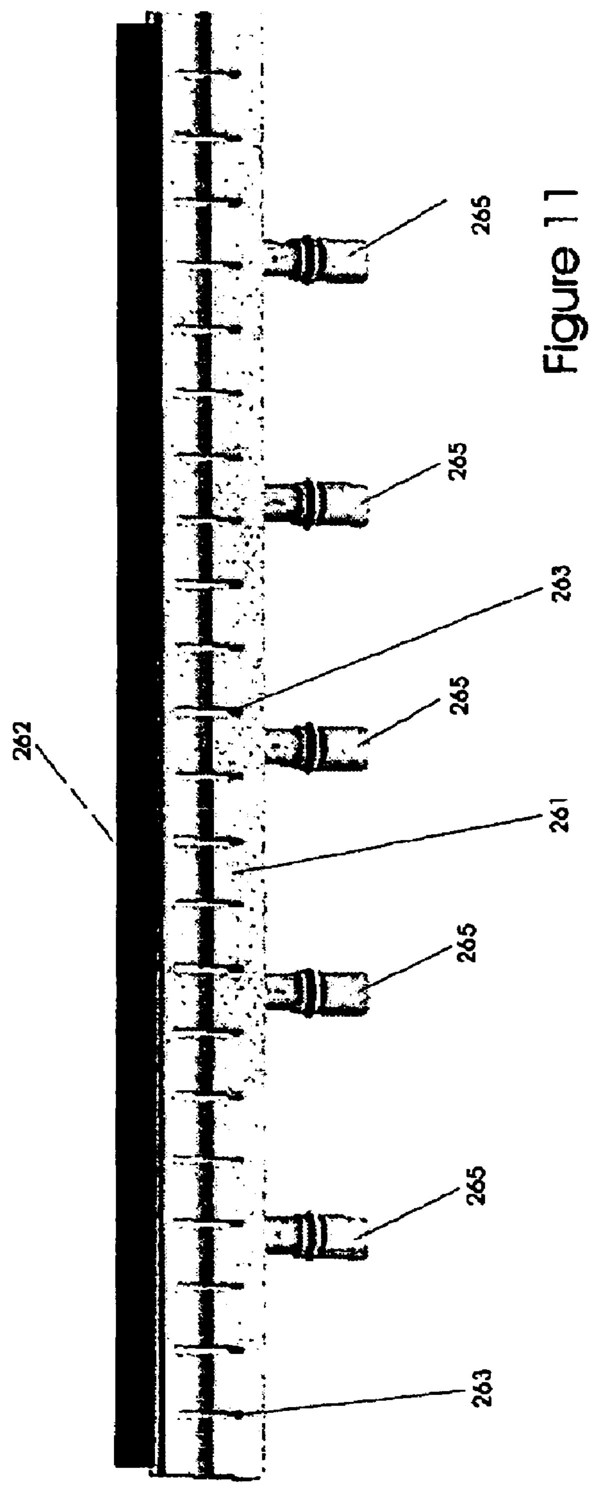
FIG. 11 is a top view of a blade holder with grooves and ultrasonic transducers placed along a width of the blade holder.

FIG. 10 shows the device 200 with identical features as shown in FIG. 8 except the blade holder 244 has a double curved blade 246 that is bent at points 248 and 250 and subjected to a pressure by a device 252. The pressure device 252 has ultrasound transducers 254 placed at the same distances from one another along the width of the pressure device 252 as the jackscrews 255. The blades 218, 246 may be as wide as seven meters or more. The blade 246 may be solidly attached or clamped to the blade holder 244 that firmly holds the blade 246 so that all or almost all vibration energy is applied at a blade tip 258 with maximum ultrasonic effect as shown by the double arrows 260. The pressure device 252 is also as wide as the blade 246 and may have grooves 284 defined therein one between every jackscrew to give flexibility and to prevent the spread of the ultrasound sideways along the width of the pressure device. FIG. 11 shows a cross machine side view of a stiff blade 262 in a blade holder 261 with grooves 263 defined therein and transducers 265 positioned at suitable distances from one another along the width of the holder 261.

Figure 12:
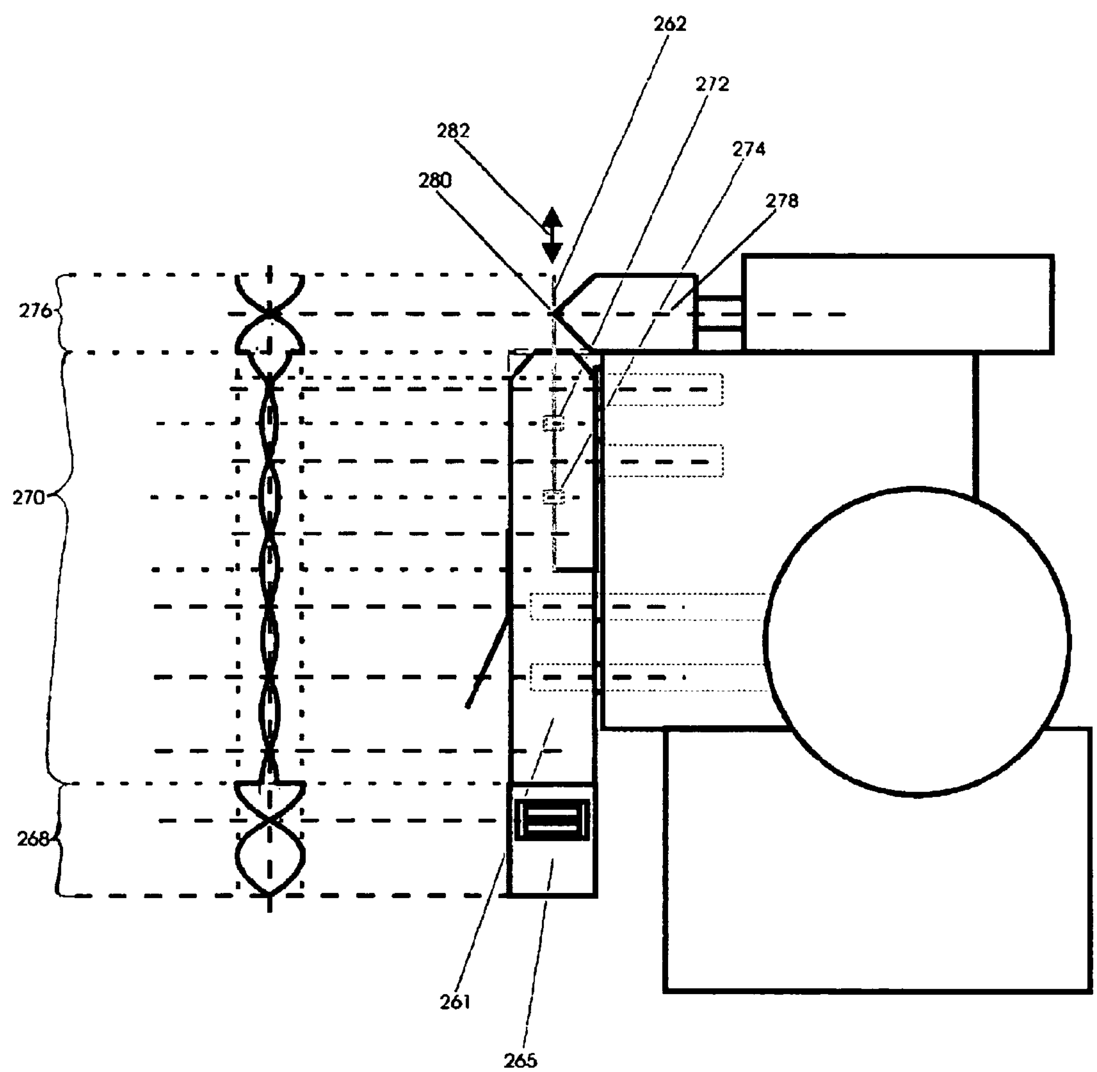
FIG. 12 is a detailed view of a blade holder with an ultrasonic transducer and a stiff blade that together act as a sonotrode and transfers wave energy to the blade tip.

FIG. 12 shows a detailed side view of a stiff blade 262 that is attached to a holder 261 that has an ultrasonic transducer 265 at suitable distances along the width of the very wide holder to vibrate the blade according to the double arrow 282. The blade 262 is firmly held in the holder 261 so that the waves are transported through the transducer 265 as shown by the amplitude diagram 268 and through the blade holder 261 as illustrated by the amplitude diagram 270 and further through the blade as shown by the amplitude diagram 276 with minimum loss of energy. All three amplitude diagrams are showing the vibration amplitude in the double arrow direction. The blade holder 261 may have fixation pins 272, 274 going through holes in the blade 262 to firmly hold the blade 262 and to transmit the vibrations from the blade holder 261 to the blade. By taking away the play between the pins and the holes in the blade during normal run it is suitable to circulate warm water through the pins and to circulate cold water through the pins when the blade is going to be changed or other service is going to be made to the blade. By taking away the play the transmission of vibration energy will be more efficient. Preferably, the amplitude of the waves 276 of the blade 262 is substantially similar to the waves 268 throughout the whole width of the blade. A pressure applicator 278 to control the cross machine coat weight profile may apply a pressure on the blade 262 at a place 280 where the vibration amplitude of the blade is at a minimum to prevent the formation of undesirable heat.

Figure 13:
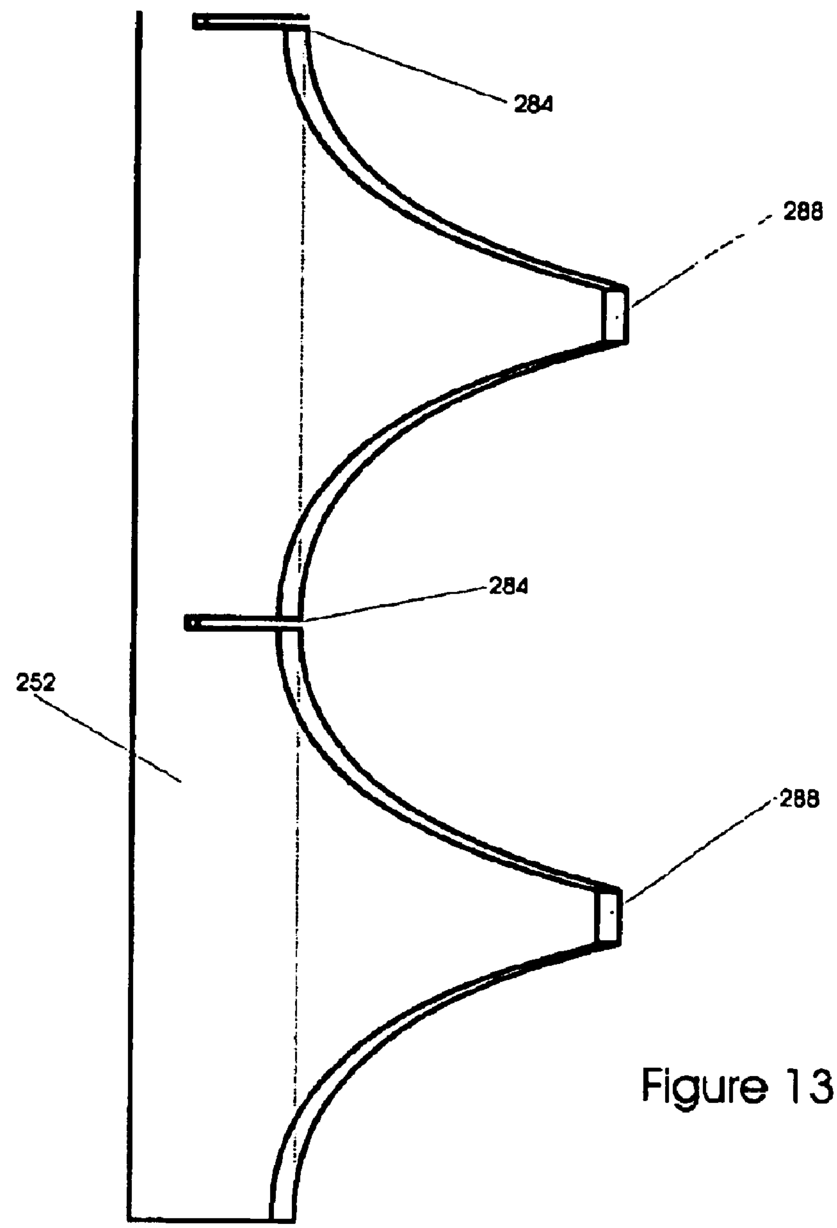
FIG. 13 is a top view and a side view of the pressure device, built as a sonotrode, used in FIG. 10.

FIG. 13 shows the pressure device 252 in FIG. 10 as a top view.

Figure 14:
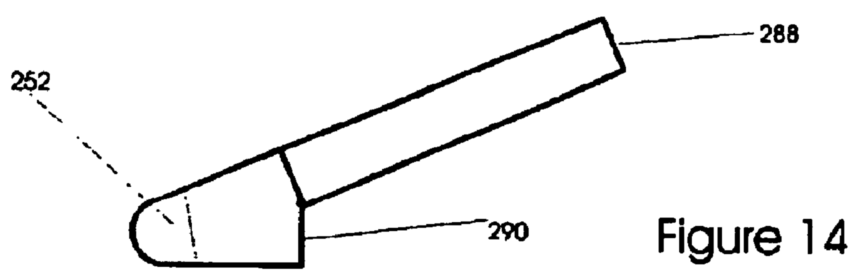
FIG. 14 is a side view of the pressure device, built as a sonotrode, used in FIG. 10.

FIG. 14 shows the pressure device 252 in FIG. 10 as a side view. The pressure device 252 is made as a sonotrode with connections for ultrasonic transducers 288 in peek points, with maximum vibration amplitude, and jackscrew connections 290 in node points, with minimum vibration amplitude, to prevent the ultrasonic power to reach the jackscrews. Grooves 284 are defined between every transducer/jack screw position in paper machine cross direction.

Figure 15:
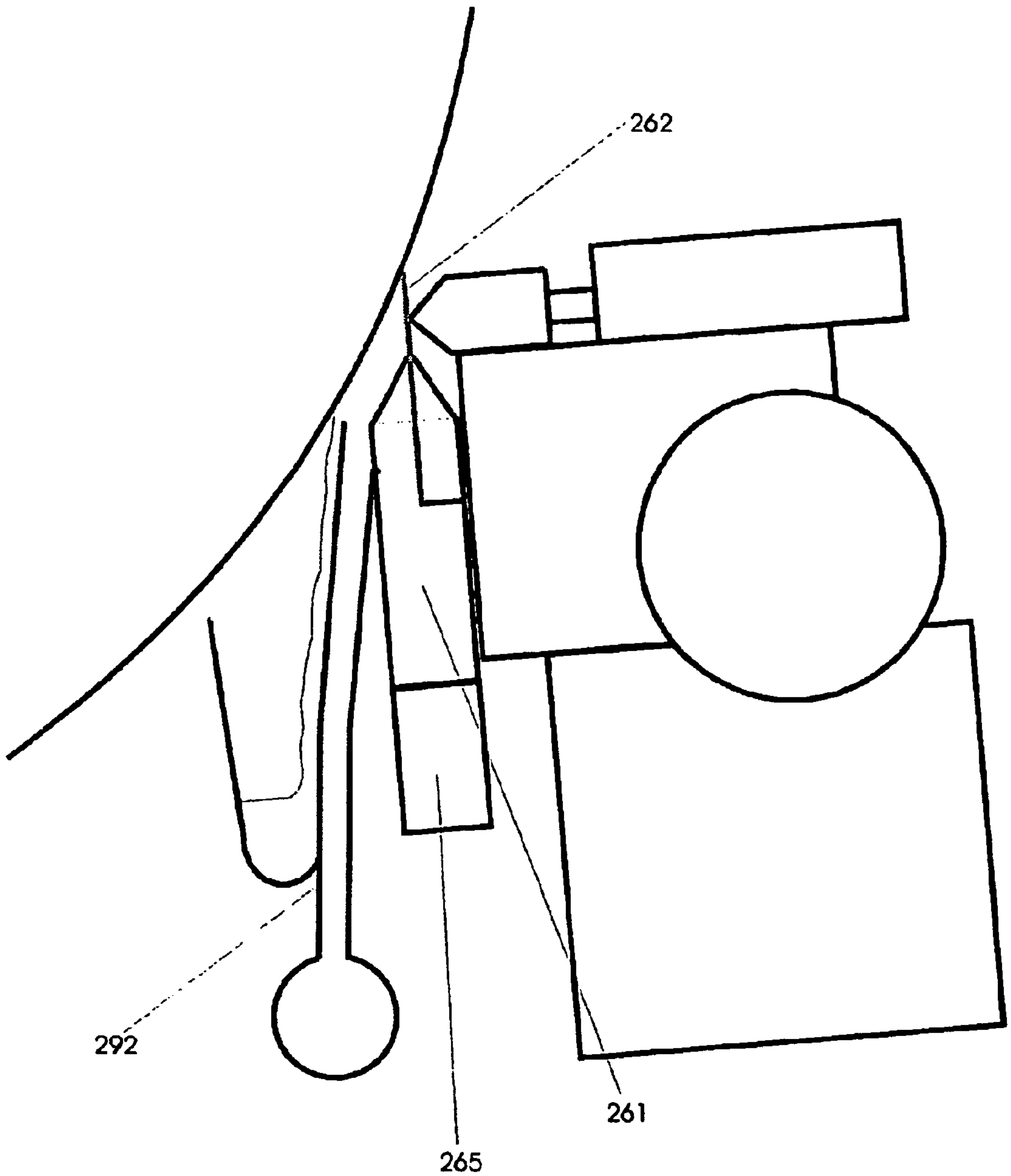
FIG. 15 is a side view of the sonotrode used in FIG. 12 combined with a short dwell time applicator for thin paper.

FIG. 15 shows a sonotrode consisting of ultrasonic transducers 265, blade holder 261 and blade 262 combined with a short dwell time applicator 292 for thin paper grades.

While the present invention has been described in accordance with preferred compositions and embodiments, it is to be understood that certain substitutions and alterations may be made thereto without departing from the spirit and scope of the following claims.

What is claimed is:

1. A method of scraping off excessive coating from a paper substance comprising:

moving a paper over a roller;

applying a coating to the paper with a coating-color applicator;

longitudinally vibrating a blade with an ultrasonic transducer in operative engagement with the blade, the longitudinal vibration being in a direction that is parallel to and along a length of the blade; and applying the vibrating blade to the paper to scrape off excessive coating from the paper.

2. The method according to claim 1 wherein the method further comprises bending the blade with a pressure applicator that bears against the blade while the paper moves past the blade.

3. The method according to claim 1 wherein the method further comprises providing the coating-color applicator with an ultrasonic applicator transducer and subjecting the coating with an ultrasonic energy from the ultrasonic applicator transducer to lower a viscosity of the coating.

4. The method according to claim 1 wherein the method further comprises transferring ultrasonic vibration from the ultrasonic transducer to a blade tip of the blade.

5. The method according to claim 1 wherein the method further comprises applying the coating through an endless wire and onto the paper.

6. The method according to claim 5 wherein the method further comprises applying the coating while subjecting the coating to ultrasonic energy.

7. A method of applying a coating on a paper substance comprising:

moving a paper over a roller;

applying a coating to the paper with a coating-color applicator;

vibrating a blade with an ultrasonic transducer in operative engagement with the blade; and applying the vibrating blade to the paper to scrape off excessive coating from the paper;

holding the blade with a holder; and providing the holder with grooves to prevent transmission of ultrasonic energy along a width of the holder.

8. The method according to claim 7 wherein the method further comprises firmly holding the blade in the holder to prevent loss of ultrasonic energy transferred from the ultrasonic transducer through the holder to the blade.

9. A method of applying a coating on a paper substance comprising:

moving a paper over a roller;

applying a coating to the paper with a coating-color applicator;

vibrating a blade with an ultrasonic transducer in operative engagement with the blade; and applying the vibrating blade to the paper to scrape off excessive coating from the paper; and bending the blade with a pressure applicator that bears against the blade while the paper moves past the blade; and providing the pressure applicator with an ultrasonic transducer that vibrates the pressure applicator.

* * * * *